United States Patent
Gotterbarm et al.

(10) Patent No.: US 12,221,674 B2
(45) Date of Patent: Feb. 11, 2025

(54) NICKEL-BASED ALLOY FOR HIGH-TEMPERATURE APPLICATIONS, AND METHOD

(71) Applicant: Siemens Energy Global GmbH & Co. KG, Bayern (DE)

(72) Inventors: Martin Gotterbarm, Uttenreuth (DE); Magnus Hasselqvist, Finspong (SE); Christoph Heinze, Markkleeberg (DE); Martin Schäfer, Berlin (DE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 867 days.

(21) Appl. No.: 17/423,887

(22) PCT Filed: Jan. 10, 2020

(86) PCT No.: PCT/EP2020/050506
§ 371 (c)(1),
(2) Date: Jul. 18, 2021

(87) PCT Pub. No.: WO2020/156779
PCT Pub. Date: Aug. 6, 2020

(65) Prior Publication Data
US 2022/0119922 A1    Apr. 21, 2022

(30) Foreign Application Priority Data
Jan. 29, 2019 (DE) .................. 10 2019 201 095.4

(51) Int. Cl.
| | | |
|---|---|---|
| *C22C 19/05* | (2006.01) | |
| *B22F 10/25* | (2021.01) | |
| *B22F 10/28* | (2021.01) | |
| *C22C 1/04* | (2023.01) | |
| *B33Y 10/00* | (2015.01) | |
| *B33Y 70/00* | (2020.01) | |
| *B33Y 80/00* | (2015.01) | |

(52) U.S. Cl.
CPC ............ *C22C 19/056* (2013.01); *B22F 10/25* (2021.01); *B22F 10/28* (2021.01); *C22C 1/0433* (2013.01); *B22F 2301/15* (2013.01); *B22F 2999/00* (2013.01); *B33Y 10/00* (2014.12); *B33Y 70/00* (2014.12); *B33Y 80/00* (2014.12)

(58) Field of Classification Search
CPC .................................................. C22C 19/056
See application file for complete search history.

(56) References Cited

U.S. PATENT DOCUMENTS

| | | | |
|---|---|---|---|
| 4,439,248 A | 3/1984 | Herchenroeder et al. | |
| 5,240,491 A | 8/1993 | Budinger et al. | |
| 6,419,763 B1 | 7/2002 | Konter et al. | |
| 2003/0042233 A1 | 3/2003 | Kelly | |
| 2003/0047251 A1* | 3/2003 | Caron .................. | C22C 19/056 148/428 |
| 2010/0296962 A1* | 11/2010 | Hasselqvist ........... | C22C 19/056 420/445 |
| 2014/0348689 A1* | 11/2014 | Hardy ..................... | B22F 3/24 419/29 |
| 2017/0021453 A1 | 1/2017 | Engeli et al. | |
| 2017/0356068 A1 | 12/2017 | Engeli et al. | |
| 2019/0048451 A1* | 2/2019 | Ota ....................... | C22C 19/056 |
| 2023/0009918 A1* | 1/2023 | Muñoz Arroyo ....... | C23C 24/08 |

FOREIGN PATENT DOCUMENTS

| | | |
|---|---|---|
| CN | 105828983 A | 8/2016 |
| CN | 107486555 A | 12/2017 |
| DE | 60220750 T2 | 3/2008 |
| EP | 1054072 A1 | 11/2000 |
| EP | 1287942 A1 | 3/2003 |
| EP | 1642993 A1 | 4/2006 |
| EP | 1914327 A1 | 4/2008 |
| EP | 2859979 A1 | 4/2015 |
| JP | H11310839 A | 11/1999 |
| WO | 2015096980 A1 | 7/2015 |
| WO | 2018083065 A1 | 5/2018 |

OTHER PUBLICATIONS

PCT International Search Report and Written Opinion of International Searching Authority mailed Apr. 8, 2020 corresponding to PCT International Application No. PCT/EP2020/050506 filed Jan. 10, 2020.

\* cited by examiner

*Primary Examiner* — Christopher S Kessler
(74) *Attorney, Agent, or Firm* — Wolter Van Dyke Davis, PLLC

(57) ABSTRACT

A nickel-base alloy for high-temperature applications, preferably for gas turbines, and a process. A selective choice of alloy elements permits the provision of an alloy which can be used to produce components devoid of cracking.

11 Claims, No Drawings

NICKEL-BASED ALLOY FOR HIGH-TEMPERATURE APPLICATIONS, AND METHOD

CROSS REFERENCE TO RELATED APPLICATIONS

This application is the US National Stage of International Application No. PCT/EP2020/050506 filed 10 Jan. 2020, and claims the benefit thereof. The International Application claims the benefit of German Application No. DE 10 2019 201 095.4 filed 29 Jan. 2019. All of the applications are incorporated by reference herein in their entirety.

FIELD OF INVENTION

The invention relates to a nickel-base alloy for high-temperature applications, advantageously for gas turbines, and to a process.

BACKGROUND OF INVENTION

It has not been possible to date to produce absolutely crack-free components by means of additive manufacturing (SLM; SLS; by means of laser beams, but also by means of electron beams (EBM)), and so the development of alloys has been continued.

SUMMARY OF INVENTION

This problem is addressed and an alloy having specifications of crucial elements is defined, which results in crack-free components.

It is therefore an object of the invention to solve the abovementioned problem.

The object is achieved by an alloy as claimed and a process as claimed.

The dependent claims list further advantageous measures that can be combined with one another as desired in order to achieve further advantages.

The alloy elements have been chosen specifically in order to be able to manufacture crack-free components. The elements silicon (Si), boron (B), zirconium (Zr) and hafnium (Hf) are of particular significance here, and carbon (C) should likewise be noted. The process conditions, particularly in the EBM process, feature a high build temperature of 1173 K-1373 K over long periods of time. Depending on the component, several days are possible. These are unique conditions that are not encountered in other known processes, such as casting, forging, welding etc. In view of these conditions, the levels of the elements zirconium (Zr), hafnium (Hf) and silicon (Si) were reduced in order to lower or completely avoid the tendency of the alloy to undergo solidification cracking. This is based on a reduction in the content of liquid phase/eutectic in the temperature range from 1173 K to the build temperature with simultaneous establishment of a smaller solidification interval.

The change in the chemical composition is advantageously determined with the addition of process parameters: movement speed, movement strategy, trace distance, power, energy beam, layer thickness and/or build temperature, which enable crack-free production.

Advantages are:
Manufacture of components is possible in a crack-free manner, component integrity is assured, increases in efficiency via AM design.

Manufacture of high-quality gas turbine components with novel alloy is possible, such that future component requirements can be covered and a contribution to an increase in efficiency of gas turbines is made.

DETAILED DESCRIPTION OF INVENTION

The chemical composition of the relevant alloy is (in % by weight):

| | |
|---|---|
| chromium (Cr) | 14.0%-16.0%, |
| preferably | 15.0%, |
| cobalt (Co) | 5.0%-6.0% |
| molybdenum (Mo) | 0.8%-1.0% |
| tungsten (W) | 3.5%-4.0% |
| aluminum (Al) | 4.5%-5.0% |
| carbon (C) | 0.04%-0.1% |
| boron (B) | 0.002%-0.013% |
| tantalum (Ta) | 7.4%-7.8% |
| hafnium (Hf) | 0.05%-0.15% |
| zirconium (Zr) | <0.01% |
| silicon (Si) | <0.02% |
| impurities | 0.002%-0.01%, | preferably at least
iron (Fe),
manganese (Mn),
vanadium (V),
platinum (Pt),
palladium (Pd),
niobium (Nb),
titanium (Ti),
rhenium (Re) or ruthenium (Ru),
and
nickel (Ni) as the balance.

The invention claimed is:
1. A nickel-base alloy, comprising (in % by weight):

| | |
|---|---|
| chromium (Cr) | 14.0%-16.0%, |
| cobalt (Co) | 5.0%-6.0% |
| molybdenum (Mo) | 0.8%-1.0% |
| tungsten (W) | 3.5%-4.0% |
| aluminum (Al) | 4.5%-5.0% |
| carbon (C) | 0.04%-0.1% |
| boron (B) | 0.002%-0.013% |
| tantalum (Ta) | 7.4%-7.8% |
| hafnium (Hf) | 0.05%-0.15% |
| zirconium (Zr) | <0.01% |
| silicon (Si) | <0.02% |
| impurities | 0.002%-0.01%, |

2. A process for producing a component, comprising:
producing an alloy as claimed in claim 1 by means of an additive manufacturing method.
3. The process as claimed in claim 2,
in which an electron beam melting (EBM) process is used.
4. The process as claimed in claim 2,
wherein the component is produced by selective sintering in a powder bed or selective melting in a powder bed.
5. The process as claimed in claim 4,
wherein the component is produced by laser beam or electron beam or powder application welding.
6. The process as claimed in claim 5,
wherein the component is produced by laser powder application welding.
7. The nickel-base alloy of claim 1, comprising:
chromium (Cr) 15.0% in % by weight.

8. The nickel-base alloy of claim 1,
wherein the impurities of 0.002%-0.01% in % by weight comprise at least one of:
iron (Fe),
manganese (Mn),
vanadium (V),
platinum (Pt),
palladium (Pd),
niobium (Nb),
titanium (Ti),
rhenium (Re), and
ruthenium (Ru).

9. A nickel-base alloy, consisting of (in % by weight):

| | |
|---|---|
| chromium (Cr) | 14.0%-16.0%, |
| cobalt (Co) | 5.0%-6.0% |
| molybdenum (Mo) | 0.8%-1.0% |
| tungsten (W) | 3.5%-4.0% |
| aluminum (Al) | 4.5%-5.0% |
| carbon (C) | 0.04%-0.1% |
| boron (B) | 0.002%-0.013% |
| tantalum (Ta) | 7.4%-7.8% |
| hafnium (Hf) | 0.05%-0.15% |
| zirconium (Zr) | <0.01% |
| silicon (Si) | <0.02% |
| impurities | 0.002%-0.01%, |
| and nickel (Ni) as the balance. | |

10. The nickel-base alloy of claim 9,
wherein the chromium (Cr) content is 15.0% (in % by weight).

11. The nickel-base alloy of claim 9,
wherein the impurities of 0.002%-0.01% in % by weight comprise at least one of:
iron (Fe),
manganese (Mn),
vanadium (V),
platinum (Pt),
palladium (Pd),
niobium (Nb),
titanium (Ti),
rhenium (Re), and
ruthenium (Ru).

* * * * *

UNITED STATES PATENT AND TRADEMARK OFFICE
CERTIFICATE OF CORRECTION

PATENT NO. : 12,221,674 B2
APPLICATION NO. : 17/423887
DATED : February 11, 2025
INVENTOR(S) : Martin Gotterbarm et al.

Page 1 of 1

It is certified that error appears in the above-identified patent and that said Letters Patent is hereby corrected as shown below:

In the Claims

Claim 1, Column 2, Line 50, after the words "impurities 0.002%-0.01%," insert -- and nickel (Ni) as the balance. --

Signed and Sealed this
Fifteenth Day of April, 2025

Coke Morgan Stewart
*Acting Director of the United States Patent and Trademark Office*